(12) United States Patent
Kuhlemann (10) Patent No.: US 7,650,801 B2
(45) Date of Patent: Jan. 26, 2010

(54) TURBINE FLOWMETER

(75) Inventor: Holger Kuhlemann, Saarstedt (DE)

(73) Assignee: M & FC Holding LLC, Raleigh, NC (US)

( * ) Notice: Subject to any disclaimer, the term of this patent is extended or adjusted under 35 U.S.C. 154(b) by 145 days.

(21) Appl. No.: 11/991,706

(22) PCT Filed: Sep. 5, 2006

(86) PCT No.: PCT/EP2006/008625

§ 371 (c)(1),
(2), (4) Date: Mar. 7, 2008

(87) PCT Pub. No.: WO2007/028567

PCT Pub. Date: Mar. 15, 2007

(65) Prior Publication Data

US 2009/0126508 A1    May 21, 2009

(30) Foreign Application Priority Data

Sep. 8, 2005   (DE) .................... 10 2005 042 579

(51) Int. Cl.
*G01F 1/05*   (2006.01)
*G01F 1/10*   (2006.01)

(52) U.S. Cl. ............... 73/861.79; 73/861.92; 73/861.93

(58) Field of Classification Search ............... 73/861.79
See application file for complete search history.

(56) References Cited

U.S. PATENT DOCUMENTS 2,709,366 A    5/1955   Potter (Continued)

FOREIGN PATENT DOCUMENTS

EP        0874226      10/1998

(Continued)

*Primary Examiner*—Harshad Patel
(74) *Attorney, Agent, or Firm*—Klaus P. Stoffel; Lucas & Mercanti, LLP (57) ABSTRACT

The invention relates to a turbine flowmeter for measuring the consumption of fluids, particularly water. The turbine flowmeter comprises a housing (1) with an inflow (2), and outflow (3) and a flow channel (4). The turbine flowmeter also comprises a measuring unit (5) for measuring and indicating the consumption. A turbine (10) with a hub (11) and a number of radial vanes (12.1, 12.2) is located inside the channel (4). A holding insert (20) is also located inside the channel (4) and is comprised of a water guide cross (20.1) and of an insert base body (20.2). The water guide cross (20.1) comprises a hub (21), radial struts (22) extending from the hub (21) to the wall of the channel (4), a nozzle body (23), which surrounds the front (14) of the turbine (10), however, a gap (17) remains through which the fluid flows, and comprises a central opening (24) in the nozzle body (23). The vanes (12.1. 12.2) of the turbine (10) are positioned near the nozzle body (23). A nozzle ring (16) connects the vanes (12.1, 12.2) and extends over the outer contour of the nozzle body (23) so that a nozzle gap (18) remains between the nozzle ring (16) and the nozzle body (23). This nozzle gap (18) communicates with the gap (17) between the nozzle body (23) and the front (14) of the turbine (10). The gap (17) and the nozzle gap (18) guide the fluid so that the turbine starts running even with the smallest flow of fluid and, even during a maximum rate of flow, keeps its position behind the water guide cross (20.1) without requiring any bearing.

28 Claims, 5 Drawing Sheets

U.S. PATENT DOCUMENTS

| | | | |
|---|---|---|---|
| 4,186,603 A | | 2/1980 | Du Bae |
| 4,189,941 A | * | 2/1980 | Loesch .................... 73/861.79 |
| 5,876,610 A | * | 3/1999 | Clack et al. ................. 210/739 |
| 6,051,144 A | * | 4/2000 | Clack et al. ................. 210/739 |
| 6,065,352 A | * | 5/2000 | Schieber ................. 73/861.79 |
| 6,079,263 A | | 6/2000 | Beddies |
| 6,481,293 B1 | * | 11/2002 | Walczak et al. .......... 73/861.77 |
| 7,214,029 B2 | * | 5/2007 | Richter ....................... 415/4.5 |

FOREIGN PATENT DOCUMENTS

| | | |
|---|---|---|
| RU | 2082102 | 6/1997 |

* cited by examiner

TURBINE FLOWMETER

This is a U.S. National Stage of application No. PCT/EP2006/008625, filed on Sep. 5, 2006. Priority is claimed on that application and on the following application:
Country: Germany, Application No.: 10 2005 042 579.8
Filed: Sep. 5, 2005.

BACKGROUND OF THE INVENTION

1. Technical Field

The invention concerns a turbine flowmeter for measuring the consumption of fluids, especially water, which comprises a housing with an intake, a discharge, and a flow tube; a counter for measuring and indicating the consumption; a turbine in the flow tube with a hub, a number of radial vanes mounted on the hub, and a more or less hemispherical front that faces the fluid flow; a holding insert, which consists of a water guide cross, which comprises a hub, radial struts that extend from the hub to the wall of the flow tube, a nozzle head that surrounds the front of the turbine, leaving a gap through which the fluid flows, and a central opening in the nozzle head, and which (holding insert) further consists of an insert base body, which comprises a hub and radial struts that extend from the hub to the wall of the flow tube; and a device that detects the revolutions of the turbine and transmits them to the counter.

2. Prior Art

RU 2082102 C1 describes the principle of a turbine flowmeter, whose turbine rotates freely suspended, i.e., without mechanical support, behind a nozzle head inserted in the fluid flow that is to be measured. The revolutions of the turbine are read out by electromagnetic means. The great advantage of this design is the complete elimination of mechanical support of the turbine, since the turbine rotates completely without contact, which is achieved by the clever use of the fluid flow acceleration that takes place in the nozzle head and the associated reduction of the pressure in the fluid.

Unfortunately, this design also has significant practical disadvantages. For one thing, trouble-free electromagnetic transmission of the rotational speed is often not possible, especially when the flowmeter housing, as is generally the case and as is necessary when high line pressures are involved, is made of steel or cast steel. For another, the suspension principle works only when the fluid has attained a certain minimum flow velocity. If the flow velocity is zero or close to zero, the position of the turbine is completely undefined. At a flow velocity that is slowly increasing from zero, the turbine is carried along by the flow and thus loses the optimum position behind the nozzle head that is necessary for the suspension principle. As a result, measurement at low volume flow rates is not guaranteed.

U.S. Pat. No. 2,709,366 discloses a similar turbine flowmeter. It has a shaft that is rigidly mounted in the center of the flow tube. The elongated turbine is furnished with two bearings and rotates on this shaft. The downstream end of the turbine is expanded. Before this expansion, there is a complementary constriction of the flow tube. This results in the formation of a gap, in which the entire fluid flow is accelerated. The resulting pressure reduction provides for the axial positioning of the turbine. Of course, the gap is very short, so that the positioning occurs only at large volume flow rates but does not occur at normal volume flow rates.

One disadvantage, however, is that the turbine has a central bore for the shaft. Due to the difference in the pressures upstream and downstream of the turbine, a portion of the fluid is drawn through this central bore. This can result in the deposition of suspended substances and minerals dissolved in the fluid, e.g., lime and magnesium. These deposits will brake the turbine, especially at low volume flow rates.

A common feature of turbine flowmeters is the mechanical transmission of the turbine revolutions to a counter. For WP turbine models, the gears used for this purpose must deflect the direction of rotation by 90°. Therefore, worm gears are generally used for this purpose, since they not only produce the desired deflection but at the same time reduce the high revolutions of the turbine to a level that can be tolerated by the counter. However, worm gears have high friction, because the gear wheels slide on each other. This also reduces the measuring sensitivity at low volume flow rates.

SUMMARY OF THE INVENTION

The objective of the present invention is to specify a turbine flowmeter of the aforementioned type, which allows mechanical transmission of the turbine revolutions from the bearingless turbine described above to the counter and has a high degree of measuring sensitivity.

This objective is achieved by a turbine flowmeter having vanes positioned close to the head, and a turbine having a nozzle ring. The nozzle ring joins the vanes and engages above the outer contour of the nozzle head so that a nozzle gap remains between the nozzle ring and the nozzle head. The nozzle gap communicates with the gap between the nozzle head and the front of the turbine.

The present invention produces increased sensitivity of the flowmeter indication at very small flow velocities due to the fact that the fluid flow accelerated in the gap between the nozzle head and the front of the turbine has an injector effect on the fluid present in the nozzle gap between the nozzle head and the nozzle ring. As a result, this volume of fluid is further accelerated. The combined volumes of fluid thus strike the turbine vanes with increased velocity and set the turbine in rotational motion.

To realize the shortest possible overall length, the turbine vanes must be moved as far forward as possible. To make this possible, the inner vanes that lie between the hub and the nozzle ring can be cut out in the area of the end of the nozzle head. Surprisingly, it was found that despite the resulting shortening of the inner turbine vanes, the sensitivity of the turbine is not diminished.

Optimum functionality and sensitivity are realized if the annular end of the nozzle head is formed as a sharp flow edge.

As was mentioned at the beginning, a disadvantage of the bearingless turbine support is that the turbine is moved away from the optimum position behind the nozzle head when the fluid flow is zero. Depending on its specific gravity, it rises or sinks in the fluid. In accordance with a refinement of the invention, this is prevented if the specific gravity of the turbine is adapted to the specific gravity of the fluid. In this case, the turbine will neither float nor sink.

A decisive improvement is realized if the turbine is balanced in such a way that all upward and downward forces vanish as soon as it is in the fluid. In this case, the turbine maintains exactly the same position at zero flow that it has before, i.e., it remains in the optimum orientation and in the optimum position behind the nozzle head.

The goal of keeping the nozzle head in a precise central position in the flow tube is realized by a two-part holding insert, which consists of a water guide cross at the front end and an insert base body at the rear end. Both elements are furnished with a hub. The flow tube and the nozzle head or the hubs are joined by radial struts.

In one embodiment of the invention, these struts are formed as flow-diverting vanes, with the vanes of the water guide cross being pitched in such a way that they optimally guide the fluid flow to the turbine vanes.

In accordance with a refinement of the invention, to this end the vanes of the insert base body are set in the opposite direction. This makes it possible to recover a large portion of the pressure drop that occurs on the vanes of the water guide cross and on the vanes of the turbine. This significantly reduces the pressure drop of the entire turbine flowmeter.

In another embodiment of the invention, the vanes of the water guide cross are positioned eccentrically. This makes it possible to guide the flow in certain preferred directions when so desired.

In addition, the vanes of the water guide cross and possibly of the insert base body as well can be formed with Z-shaped bends. This also serves the purpose of guiding the flow and increases the measuring sensitivity.

It is advantageous for the water guide cross and the insert base body of the holding insert to be joined with a plug connection. This increases the positional accuracy and improves the ease of operation.

If the fluid undergoes a change in density in the course of time, for example, due to temperature variation, compensation by adaptation of the specific gravity and balancing is no longer possible. For this eventuality, the turbine is equipped with a shaft that runs in bearing bushes, which are positioned at one end in a hub of the water guide cross and at the other end in a hub of the insert base body towards the rear.

In an alternative embodiment, the bearing bushes are positioned in the turbine, while the water guide cross and the insert base body each support a journal. These bearings can have a large amount of bearing play in both the axial direction and the radial direction, since they are no longer needed as soon as the fluid starts to flow and the turbine takes up its position behind the nozzle head due to the flow and pressure conditions. Another advantage of bearings of this type with bearing play is that the turbine cannot be swept away even in the most unfavorable case.

Friction arises between the turbine and the fluid, and this brakes the rotation of the turbine. Therefore, an individual skilled in the art will seize upon all measures that are known to him to reduce this fluid friction. Surprisingly, it was found that friction can be significantly reduced by furnishing the hemispherical front of the turbine with indentations in the form of spherical segments, comparable to a golf ball.

It goes without saying that the design of the nozzle head is also a determining factor for the function of the bearingless bearing. In accordance with a first embodiment of the invention, the inner contour of the nozzle head can be hemispherical, adapted to the hemispherical front of the turbine.

Alternatively, however, the inner contour of the nozzle head can also have a cylindrical shape with a flat base. A shape of this type can be simply produced by plastic injection molding.

In accordance with a third variant, concentric recesses can be produced in the hemispherical inner contour. In this way, material accumulations are avoided and plastic is saved without impairment of function.

The shape of the nozzle intake in the nozzle head is also important for optimum function. As is already well known in itself, the intake can be funnel-shaped, preferably with a rounded edge.

It is advantageous for the flowmeter housing to have an upper opening, through which the completely assembled holding insert can be lifted in and out.

In accordance with the invention, a crown wheel and pinion can be used instead of a worm gear. This gear design allows a 90° deflection and at the same time a speed reduction, similar to a worm gear. Since the pinion and crown wheel carry out a rolling movement and not a sliding movement, the friction is significantly reduced compared to a worm gear. Finally, this type of gear allows large axial movements of the turbine relative to the stationary crown wheel, so that the functional principle of the bearingless turbine is definitely supported.

In accordance with an alternative embodiment, the turbine has a hub, on which one or, better, two permanent magnets are mounted. A sensor tube that contains one or, better, two magnetic field sensors is mounted next to the hub. The signals of the sensors are converted to consumption data by an electronic counter.

Like all other turbine flowmeters, the flowmeter of the invention needs an automatic control system. It is advantageous for this automatic control system to be designed as a bypass channel in the holding insert; a bulkhead, which is raised, lowered, or turned, makes it possible to vary the free channel cross section.

In accordance with one embodiment designed for this purpose, a threaded bolt is provided, which allows infinitely variable raising and lowering of the bulkhead. This threaded bolt is accessible only when the counter has been removed.

Since the gears used in accordance with the invention produce a significant reduction of the speed, the automatic control of the turbine flowmeter during operation by variation of the bypass cross section can take a long time. In order to shorten this time, an optical waveguide can be installed between the counter and the turbine vanes. The rotation of the turbine vanes past the place of installation is detected by the waveguide. In this way, a pulse number that corresponds to the number of turbine vanes is obtained for each revolution of the turbine, so that the turbine speed can be measured in an extremely short time.

BRIEF DESCRIPTION OF THE DRAWINGS

The invention will now be explained in greater detail with reference to the drawings, which show specific embodiments of the invention.

MEANS FOR REALIZING THE INVENTION AND INDUSTRIAL APPLICABILITY

Figure 1:
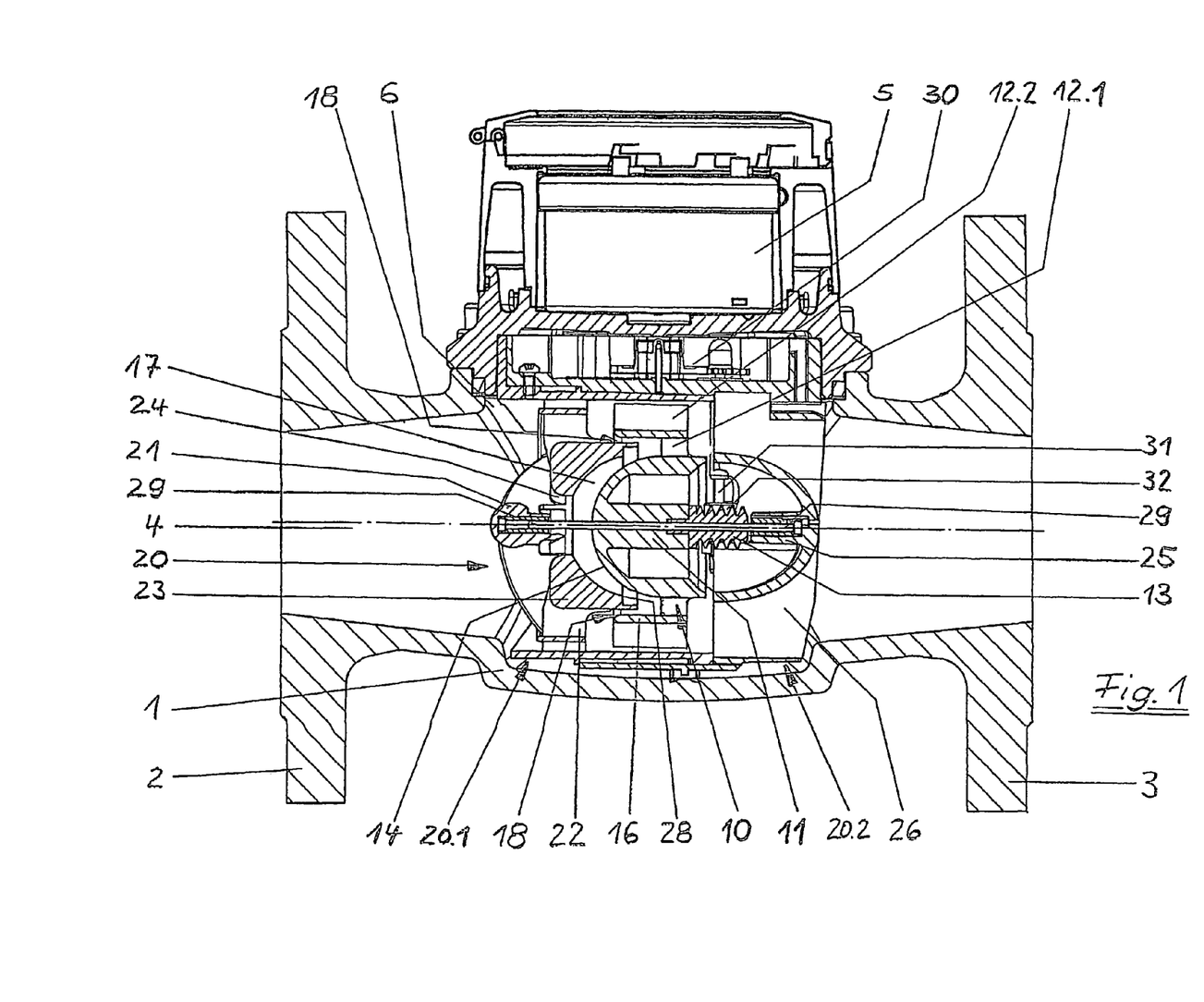
FIG. 1 shows a longitudinal section through a turbine flowmeter.

FIG. 1 shows a longitudinal section through a turbine flowmeter, which comprises a housing 1 with an intake 2, a discharge 3, and a cylindrical or possibly conical flow tube 4. On its upper side, the housing 1 has an opening 6, above which a counter 5 is mounted.

The actual measuring device, which consists of a turbine 10, which is housed in a two-part holding insert 20 that is formed by a water guide cross 20.1 and an insert base body 20.2, can be seen below the counter 5. The water guide cross and insert base body (20.1, 20.2) are assembled with each other. The holding insert 20 can be lifted in and out through the housing opening 6.

The water guide cross 20.1 of the holding insert 20 comprises a central hub 21, which is positioned in the center of the flow tube 4 with the aid of struts 22, which are designed as flow-guiding vanes.

In addition, the water guide cross 20.1 comprises a central nozzle head 23 with a nozzle intake 24. The nozzle intake 24 is basically cylindrically bounded and is rounded at the front end, although it could possibly have sharp edges. This makes it possible to achieve guidance of the flow, combined with low turbulence.

The inner surface of the nozzle head 23 is partly hemispherical and partly cylindrical.

The insert base body 20.2 of the holding insert 20 likewise comprises a central hub 25, which is positioned in the center of the flow tube 4 with the aid of struts 26, which are possibly designed as flow-guiding vanes.

The turbine 10 is located inside the holding insert 20. The turbine 10 comprises a hub 11, on which a series of radial vanes 12 is mounted. The front 14 of the turbine 10, which is submerged in the nozzle head 23, has a hemispherical shape.

An endless screw 13 is formed on the rear side of the hub 11. A worm gear 32, which is mounted on a transmission shaft 31, meshes with the endless screw 13. The shaft 31 and worm gear 32 are parts of a mechanism 30 that transmits the revolutions of the turbine 10 to the counter 5.

As FIG. 1 shows, the turbine 10 has a shaft that passes all the way through, the ends of which are supported in bearing bushes 29 in the hubs 21, 25 of the water guide cross 20.1 and the insert base body 20.2, respectively. The purpose of these bearings 29 is to keep the turbine 10 in an optimum position for starting up at very low volume flow rates. With increasing fluid flow, as soon as the turbine 10 becomes positioned behind the nozzle head 23, these bearings are no longer needed. Therefore, the bearing play is selected suitably large.

In principle, it is also possible to position the bearing bushes in the turbine, while the water guide cross and the insert base body each support a journal.

Figure 2:
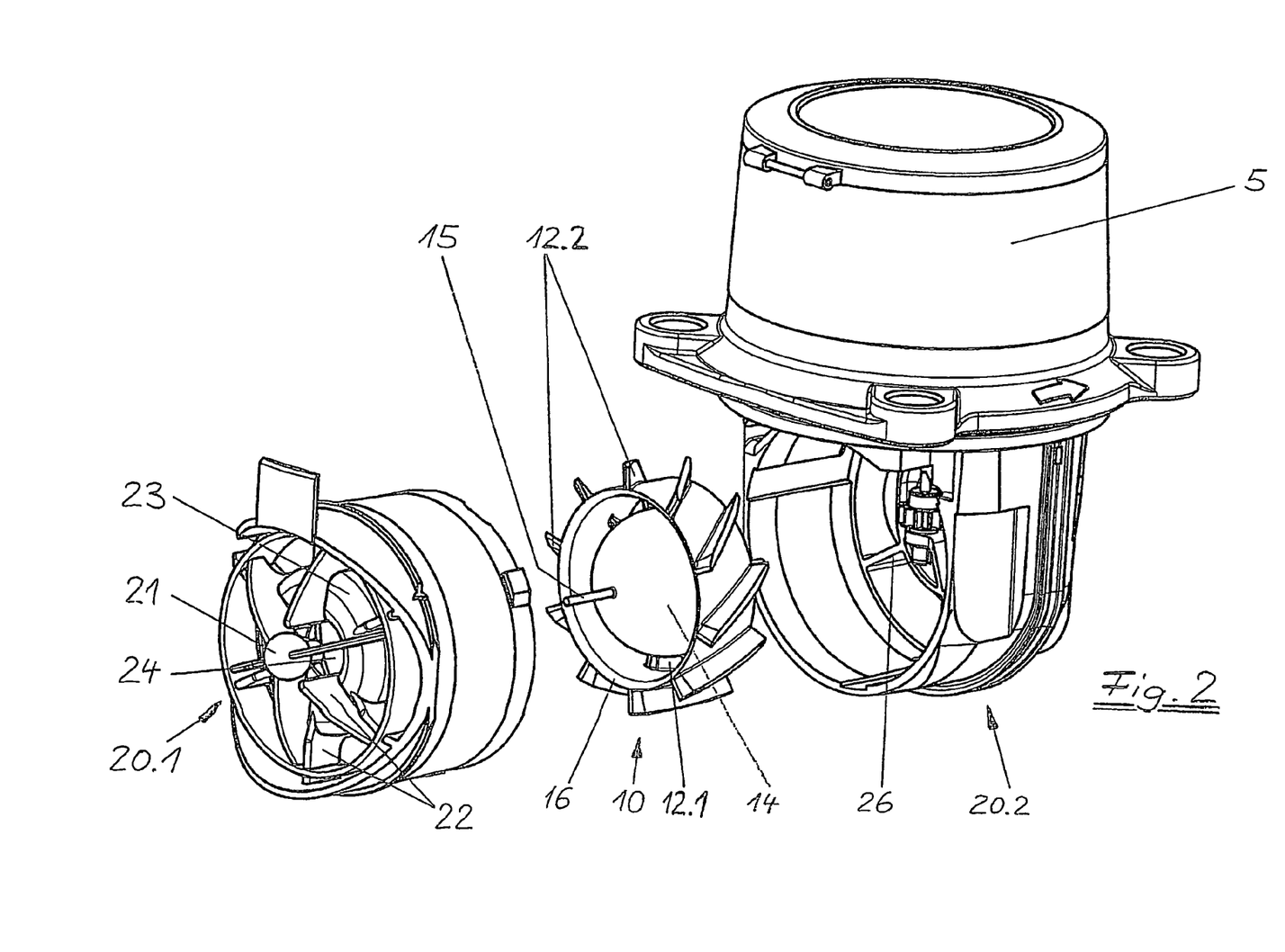
FIG. 2 shows an exploded isometric view of the essential parts of the turbine flowmeter of FIG. 1.

FIG. 2 shows an exploded view of the water guide cross 20.1 and the insert base body 20.2 of the holding insert 20. The counter 5 is mounted on the insert base body 20.2. The turbine 10 is shown between the water guide cross 20.1 and the insert base body 20.2.

As soon as the elements 10, 20.1, and 20.2 shown in the drawing are assembled, the holding insert 20 constitutes a complete unit, which can be lifted in and out through the upper opening 6 in the flowmeter housing 1. The opening 6 in the flowmeter housing 1 is sealed by the mounted counter 5.

Figure 3:
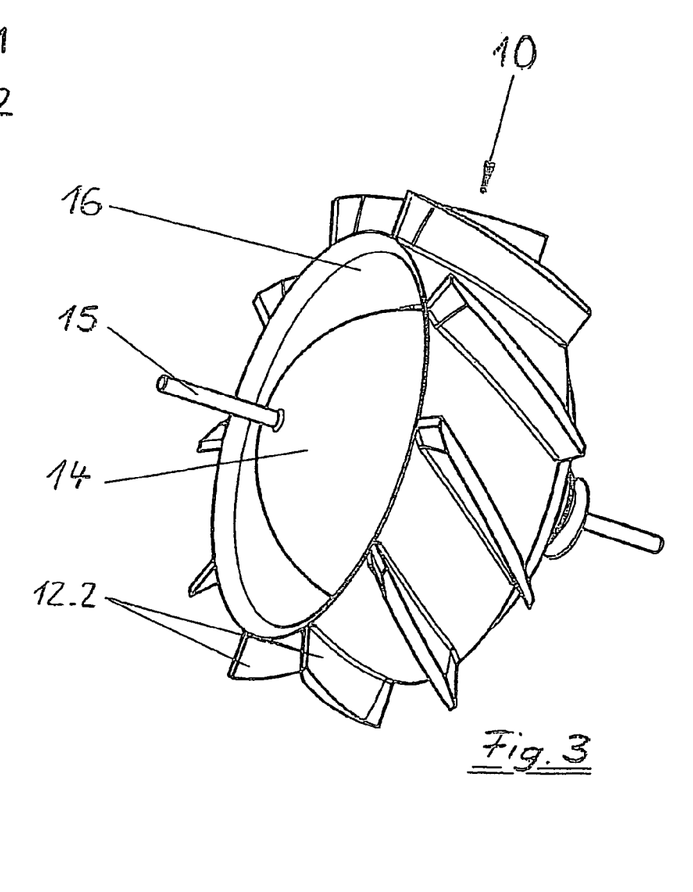
FIG. 3 shows an isometric view of the front end of the turbine.
Figure 4:
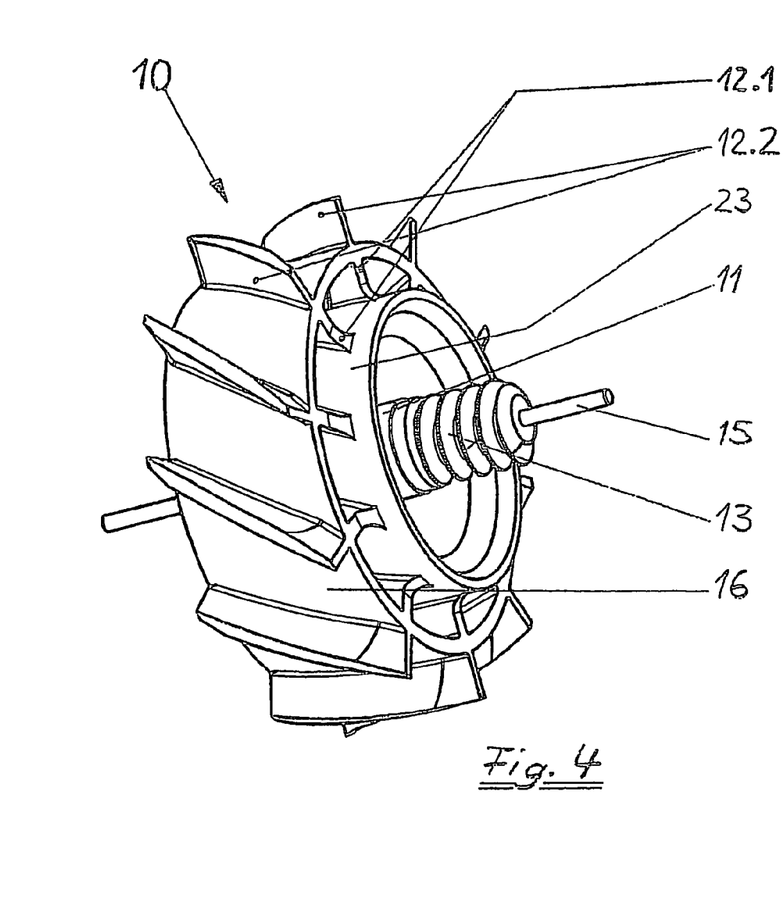
FIG. 4 shows an isometric view of the rear end of the turbine.

FIG. 3 shows an oblique view of the front end of the turbine, and FIG. 4 shows an oblique view of the rear end. The drawings show the hub 11 with the hemispherical front 14 and the shaft end 15. Vanes 12.1, 12.2 are mounted radially on the hub 11 and are held by a nozzle ring 16. The nozzle ring 16 is spaced from the hub 11 in such a way that a nozzle gap 18 is formed between the nozzle head 23 and the nozzle ring 16. The fluid accelerated in the gap 17 between the nozzle head 23 and the hub 11 acts as an injector on the fluid in the nozzle gap 18 and further accelerates this volume of fluid. The accelerated fluid strikes the turbine vanes 12.1 and in this way, even at extremely low flow velocities, sets the turbine 10, the endless screw 13, which meshes with the worm gear 32, and the shaft end 15 in rotational motion.

Figure 5:
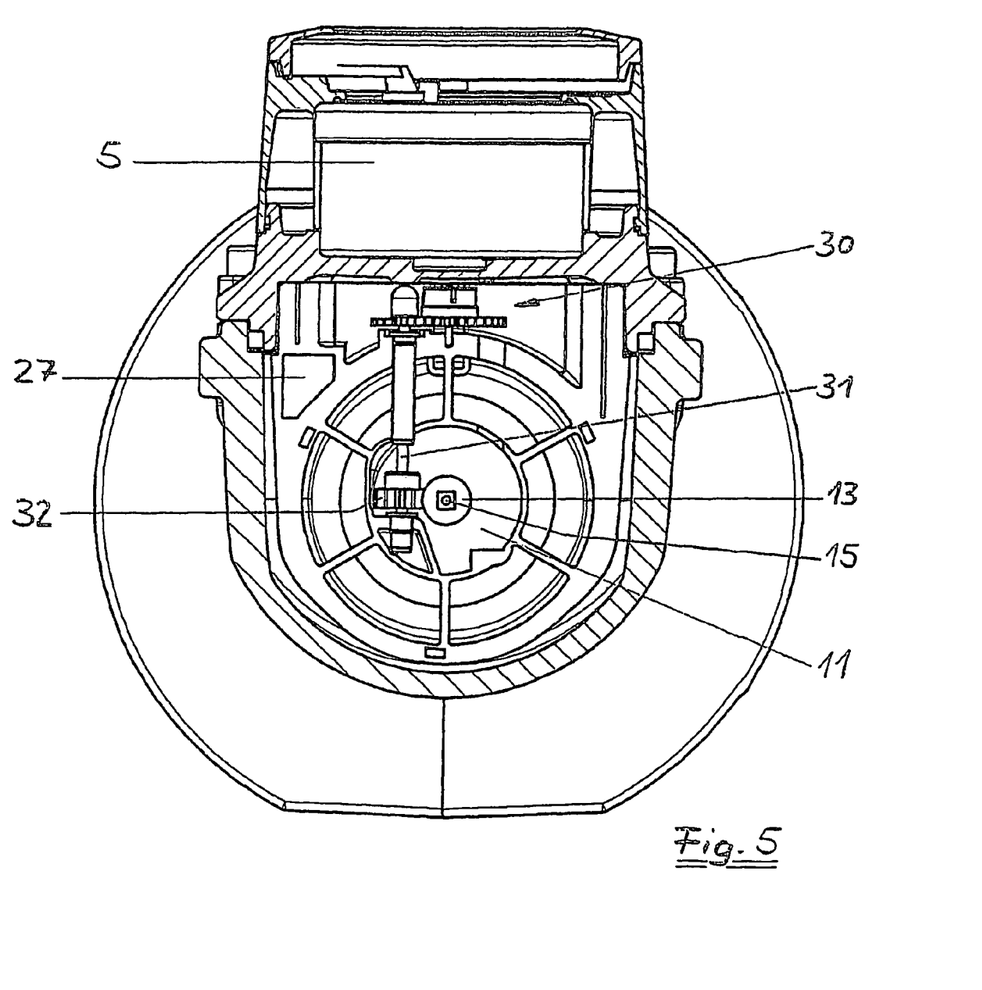
FIG. 5 shows a view of the rear side of the turbine flowmeter of FIG. 1 with mechanical determination of consumption.

FIG. 5 shows a view of the rear side of the turbine flowmeter of FIG. 1. The insert base body is removed, so that the shaft end 15 on the rear end and the endless screw 13 mounted on it can be seen. The worm gear 32, which meshes with the endless screw 13, is seen mounted on the transmission shaft 31. Other gear wheels 30 transmit the revolutions of the turbine 10 to the mechanical counter 5.

Figure 6:
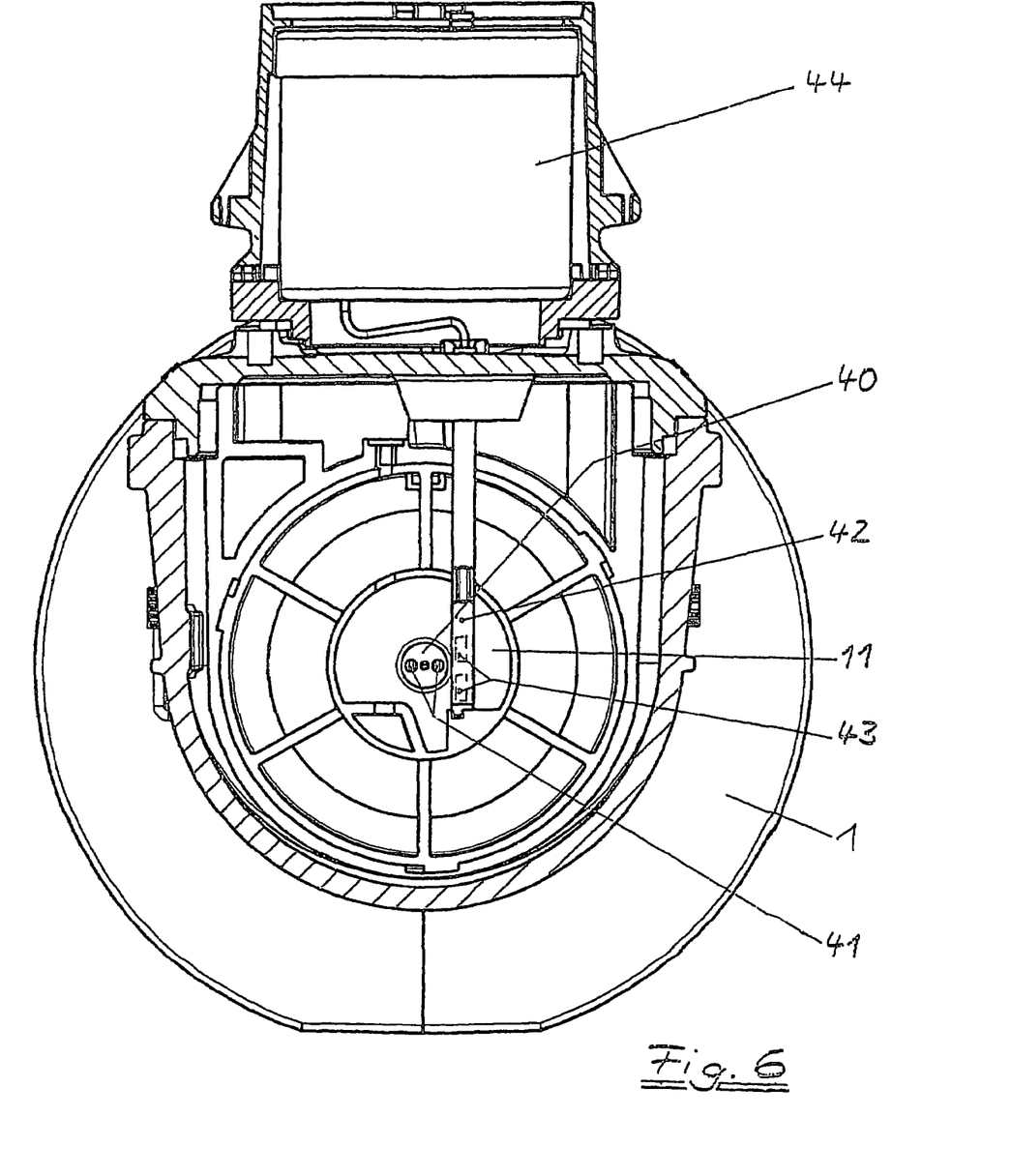
FIG. 6 shows a view of the rear side of a turbine flowmeter with electronic determination of consumption.

FIG. 6 shows a view of the rear side of a turbine flowmeter with electronic determination of consumption. A hub 40, which carries two permanent magnets 41, is mounted on the shaft of the turbine 10. Mounted next to the hub 40 is a sensor tube 42, in which two magnetic field sensors 43 are positioned in such a way that they detect the magnetic fields generated by the permanent magnets 41. The sensor signals are transmitted to an electronic counter 44, which calculates the consumption data.

The invention claimed is:

1. A turbine flowmeter for measuring consumption of fluids, comprising:
    a housing with an intake, a discharge, and a flow tube;
    a counter for measuring and indicating the consumption;
    a turbine in the flow tube with a hub, a number of radial vanes mounted on the hub, and a substantially hemispherical front that faces the fluid flow;
    a holding insert made up of a water guide cross, which comprises a hub, radial struts that extend from the hub to a wall of the flow tube, a nozzle head that surrounds the front of the turbine so as to leave a gap through which the fluid flows, and a central opening in the nozzle head;
    an insert base body which includes a hub and radial struts that extend from the hub to the wall of the flow tube; and
    a device that detects revolutions of the turbine and transmits them to the counter, the vanes of the turbine being positioned close to the nozzle head, the turbine including a nozzle ring that joins the vanes and engages above an outer contour of the nozzle head so that a nozzle gap remains between the nozzle ring and the nozzle head, which the nozzle gap communicates with the gap formed by the nozzle head surrounding the front of the turbine.

2. The turbine flowmeter in accordance with claim 1, wherein the vanes positioned between the hub and the nozzle ring are cut out in the area of the nozzle head.

3. The turbine flowmeter in accordance with claim 1, wherein an annular end of the nozzle head is formed as a sharp flow edge.

4. The turbine flowmeter in accordance with claim 1, wherein the turbine is supported in two antifriction bearings formed by a shaft and two bearing bushes.

5. The turbine flowmeter in accordance with claim 1, wherein the turbine is supported in two antifriction bearings formed by two journals and two bearing bushes.

6. The turbine flowmeter in accordance with claim 4, wherein there is a large amount of bearing play between the shaft and the bearing bush.

7. The turbine flowmeter in accordance with claim 5, wherein there is a large amount of bearing play between the shaft and the bearing bush 8. The turbine flowmeter in accordance with claim 1, wherein the specific gravity of the turbine is adapted to the specific gravity of the fluid.

9. The turbine flowmeter in accordance with claim 1, wherein the turbine is balanced so that all upward and downward forces compensate one another as soon as the turbine is positioned in the fluid.

10. The turbine flowmeter in accordance with claim 1, wherein the front of the turbine has indentations shaped as spherical segments.

11. The turbine flowmeter in accordance with claim 1, wherein an inner contour of the nozzle head is substantially hemispherical.

12. The turbine flowmeter in accordance with claim 11, wherein the inner contour of the nozzle head has concentric recesses.

13. The turbine flowmeter in accordance with claim 1, wherein an inner contour of the nozzle head is cylindrical with a flat base.

14. The turbine flowmeter in accordance with 1, wherein the nozzle intake is funnel-shaped.

15. The turbine flowmeter in accordance with claim 1, wherein the struts of the water guide cross and/or the insert base body are formed as vanes.

16. The turbine flowmeter in accordance with claim 15, wherein the vanes of the water guide cross are pitched and systematically guide the fluid flow to the turbine vanes.

17. The turbine flowmeter in accordance with claim 16, wherein the vanes of the insert base body are set in an opposite direction to the vanes of the water guide cross.

18. The turbine flowmeter in accordance with claim 15, wherein the vanes of the water guide cross are formed with Z-shaped bends.

19. The turbine flowmeter in accordance with claim 1, wherein the water guide cross and the insert base body are joined by a plug connection.

20. The turbine flowmeter in accordance with claim 1, wherein the hub of the turbine carries an endless screw and a worm gear meshes with the endless screw.

21. The turbine flowmeter in accordance with claim 1, wherein the hub of the turbine carries a pinion and a crown wheel meshes with the pinion.

22. The turbine flowmeter in accordance with claim 1, wherein the turbine hub has at least one permanent magnet, a sensor tube is positioned next to the hub; at least one magnetic field sensor is positioned in the sensor tube; and an electronic counter converts sensor signals to consumption data.

23. The turbine flowmeter in accordance with claim 22, wherein two magnets and/or two magnetic field sensors are provided.

24. The turbine flowmeter in accordance with claim 1, wherein the housing has an upper opening, the fully assembled holding insert being liftable in and out through the upper opening.

25. The turbine flowmeter in accordance with claim 1, wherein the holding insert has a bypass channel with a free cross section that is variable by a movable bulkhead.

26. The turbine flowmeter in accordance with claim 25, and further comprising a threaded bolt arranged to raise and lower the bulkhead and accessible only when the counter is removed.

27. The turbine flowmeter in accordance with claim 1, and further comprising an optical waveguide installed between the counter and the turbine vanes.

28. The turbine flowmeter in accordance with claim 1, and further comprising: a hub with two permanent magnets mounted on the turbine; a sensor tube with two magnetic field sensor positioned next to the hub; and an electronic counter operative to calculate the consumption from signals from the sensor.

* * * * *